United States Patent
Fruth

(10) Patent No.: US 11,446,873 B2
(45) Date of Patent: Sep. 20, 2022

(54) TRANSPORTATION OF PULVERULENT BUILD-UP MATERIAL FOR PRODUCING THREE-DIMENSIONAL OBJECTS

(71) Applicant: FIT AG, Lupburg (DE)

(72) Inventor: Carl Fruth, Lupburg (DE)

(73) Assignee: FIT AG, Lupburg (DE)

( * ) Notice: Subject to any disclaimer, the term of this patent is extended or adjusted under 35 U.S.C. 154(b) by 712 days.

(21) Appl. No.: 16/464,366

(22) PCT Filed: Nov. 20, 2017

(86) PCT No.: PCT/EP2017/001359
§ 371 (c)(1),
(2) Date: May 28, 2019

(87) PCT Pub. No.: WO2018/095566
PCT Pub. Date: May 31, 2018

(65) Prior Publication Data
US 2021/0114301 A1  Apr. 22, 2021

(30) Foreign Application Priority Data
Nov. 27, 2016 (DE) .......................... 102016122838.9

(51) Int. Cl.
| | |
|---|---|
| *B29C 67/00* | (2017.01) |
| *B29C 64/321* | (2017.01) |
| *B33Y 30/00* | (2015.01) |
| *B33Y 40/00* | (2020.01) |
| *B33Y 50/02* | (2015.01) |

(Continued)

(52) U.S. Cl.
CPC ............ *B29C 64/321* (2017.08); *B22F 10/68* (2021.01); *B22F 10/85* (2021.01); *B22F 12/50* (2021.01); *B29C 64/35* (2017.08); *B29C 64/364* (2017.08); *B29C 64/393* (2017.08); *B33Y 30/00* (2014.12);

(Continued)

(58) Field of Classification Search
CPC ... B29C 64/321; B29C 64/364; B29C 64/393; B29C 64/35; B29C 64/153; B33Y 30/00; B33Y 40/00; B33Y 50/02; B22F 10/68; B22F 10/85; B22F 12/50
See application file for complete search history.

(56) References Cited

U.S. PATENT DOCUMENTS

| | | | |
|---|---|---|---|
| 6,676,731 | B1 | 1/2004 | Deppe et al. |
| 7,887,316 | B2 | 2/2011 | Cox |

(Continued)

FOREIGN PATENT DOCUMENTS

| | | |
|---|---|---|
| CN | 105324199 A | 2/2016 |
| CN | 106001576 A | 10/2016 |

(Continued)

*Primary Examiner* — Ryan M Ochylski
(74) *Attorney, Agent, or Firm* — Laurence A. Greenberg; Werner H. Stemer; Ralph E. Locher

(57) ABSTRACT

In the field of producing three-dimensional objects by additive manufacturing, methods and apparatuses are provided for transporting powdered build material that is used for the production of three-dimensional objects. In order to furnish a simple, reliably operating, and maintenance-free solution for material transportation from one space to another while simultaneously influencing gas exchange between the two spaces, in particular while maintaining gas separation of the spaces, it is proposed that a powder column be formed with the build material, which column influences the gas exchange, in particular prevents a gas exchange between the spaces.

6 Claims, 1 Drawing Sheet

(51) Int. Cl.
  *B29C 64/364* (2017.01)
  *B29C 64/393* (2017.01)
  *B29C 64/35* (2017.01)
  *B22F 10/68* (2021.01)
  *B22F 10/85* (2021.01)
  *B22F 12/50* (2021.01)
  *B29C 64/153* (2017.01)

(52) U.S. Cl.
  CPC .............. *B33Y 40/00* (2014.12); *B33Y 50/02* (2014.12); *B29C 64/153* (2017.08)

(56) References Cited

U.S. PATENT DOCUMENTS

| | | | |
|---|---|---|---|
| 8,550,802 | B2 | 10/2013 | Fuwa et al. |
| 2005/0116391 | A1 | 6/2005 | Lindemann et al. |
| 2008/0241404 | A1 | 10/2008 | Allaman et al. |
| 2010/0192806 | A1 | 8/2010 | Heugel et al. |
| 2015/0306666 | A1 | 10/2015 | Honda |
| 2016/0107263 | A1 | 4/2016 | Koerber |
| 2016/0193696 | A1 | 7/2016 | McFarland et al. |
| 2017/0259337 | A1 | 9/2017 | Furukawa |
| 2019/0337714 | A1 | 11/2019 | Carroll et al. |

FOREIGN PATENT DOCUMENTS

| | | |
|---|---|---|
| DE | 19950101 C1 | 4/2001 |
| EP | 1514622 A1 | 3/2005 |
| GB | 2520161 A | 5/2015 |
| JP | 2006248231 A | 9/2006 |
| JP | 2009508723 A | 3/2009 |
| JP | 2009279928 A | 12/2009 |
| JP | 2012515668 A | 7/2012 |
| JP | 2015182252 A | 10/2015 |
| JP | 2016532781 A | 10/2016 |
| JP | 6019268 B1 | 11/2016 |
| WO | 2016046539 A2 | 3/2016 |
| WO | 2017081813 A1 | 5/2017 |

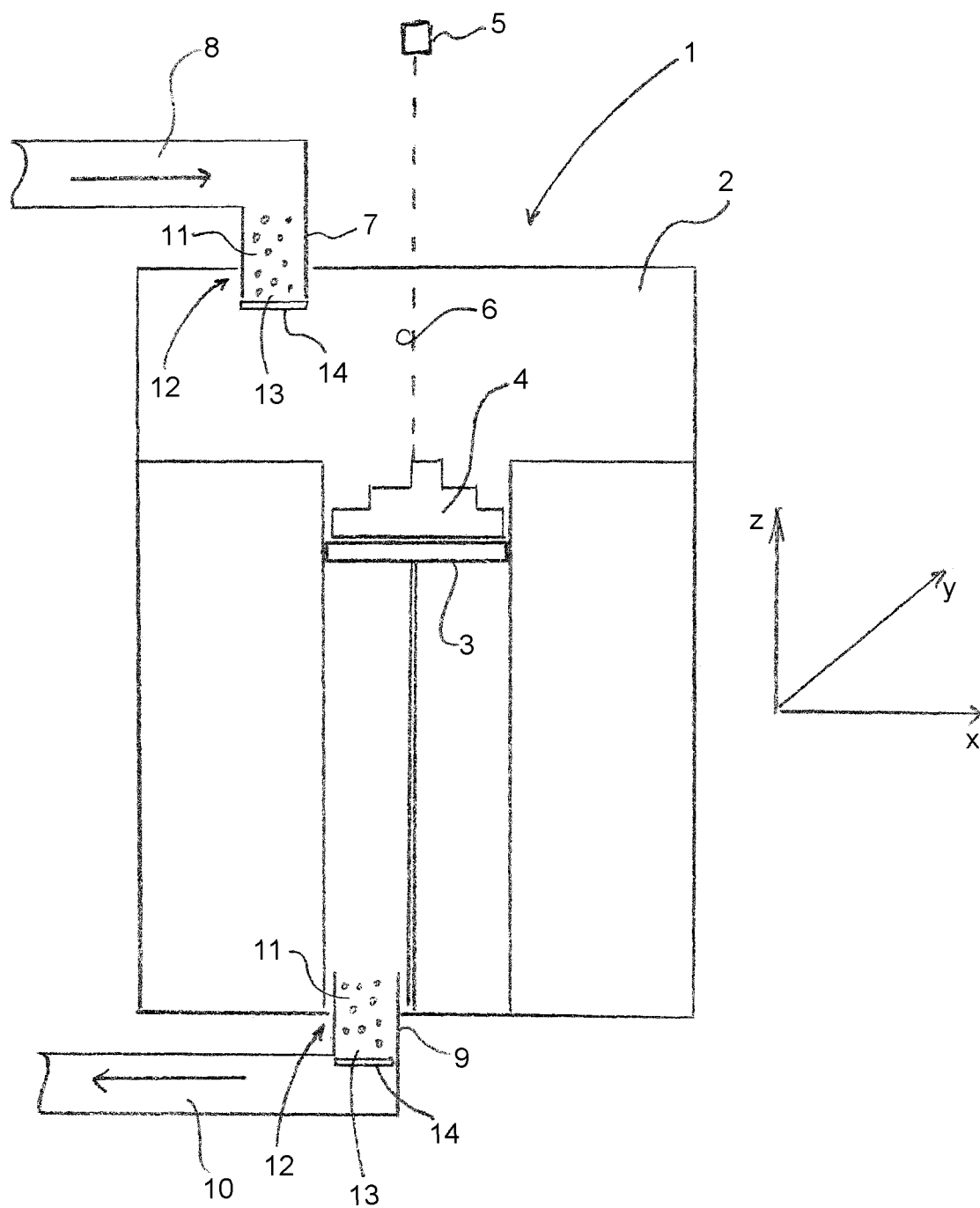

TRANSPORTATION OF PULVERULENT BUILD-UP MATERIAL FOR PRODUCING THREE-DIMENSIONAL OBJECTS

BACKGROUND OF THE INVENTION

Field of the Invention

The invention relates in general to the field of producing three-dimensional objects by additive manufacturing. The invention relates in particular to methods and apparatuses for transporting powdered build material that is used for the production of three-dimensional objects.

Additive manufacturing methods are known from the existing art. Examples thereof are laser melting, mask sintering, drop-on-powder/drop-on-bed, stereolithography, and the like. The objects as a rule are built up by selective solidification of a build material applied in layers. Systems with which a layer building method of this kind can be carried out are also referred to as "rapid prototyping" systems. These layer building methods serve for the production of components built up in layers from solidifiable material, for example resin, plastic, metal, or ceramic, and are used e.g. for the manufacture of technical prototypes. With an additive manufacturing methods, three-dimensional objects can be produced directly from CAD data.

In a layer building method of this kind the objects are built in layers, i.e. layers of the build material are applied successively one above another. Before the respective next layers are applied, those points in the respective layers which correspond to the object that is to be manufactured are selectively solidified. Solidification is effected, for example, by locally heating the (usually powdered) build material with the aid of a radiation source. An exactly defined object structure of any kind can be generated by deliberate introduction of radiation in suitable fashion into the desired regions. The layer thickness is also adjustable. A method of this kind is usable in particular for the production of three-dimensional bodies by successively generating multiple thin, individually constituted layers.

In the context of production of the objects, the powdered build material that is used must be transported at least once, but as a rule several times, from one location to a different location physically separated therefrom or, in other words, from one space to another space. This relates both to transportation within the layer building system itself and to transportation into systems for processing the build material, i.e. for use in auxiliary processes such as sieving, mixing, purifying, drying, etc. Transportation of the build material for the purpose of supplying powder to the layer building system is particularly critical, especially upon filling and emptying of the process chamber in which layered building of the three-dimensional object is effected.

The spaces (e.g. process chambers, reservoir containers, delivery and removal conduits, etc.) often comprise different atmospheres. In other words, the gas composition, temperature, humidity, pressure, etc. in the individual spaces can be different. For example, ordinary air can be present in the first space while dry air or an inert gas can be present in the second space. Comparatively inexpensive gases such as nitrogen, or expensive gases such as argon, can be present in the spaces. In such cases, a change of space is always associated with a change of atmosphere. Gas separation of the spaces is thus necessary in order to prevent mixing of the individual atmospheres, for example in order to avoid contamination of the atmosphere or loss of an expensive gas. The objective here is to achieve one-hundred-percent gas separation, i.e. to avoid as completely as possible any mixing of the atmospheres. In practice, it is often sufficient to ensure that no gas exchange that is relevant in terms of operation of the system, or no gas exchange exceeding a tolerable value, takes place between the spaces.

A variety of airlock designs and/or sealing designs are known from the existing art, for example rotary airlock feeders, double flap valves, and valves of a wide variety of types, for carrying out material transportation from one space to another while maintaining gas separation of the spaces. All these solutions are complex in terms of design, especially when reliable gas separation is needed. They are furthermore an additionally required, usually movable, mechanical component that increases the failure susceptibility of the overall system. The powdered build material can become caught between moving parts of the valves and block them. If cleaning or repair is necessary, the airlock must be removed and operation of the layer building system interrupted for that purpose.

SUMMARY OF THE INVENTION

An object of the present invention is therefore to furnish a simple, reliably operating, and maintenance-free solution for material transportation from one space to another while simultaneously influencing gas exchange between the two spaces, in particular while maintaining gas separation of the spaces.

This object is achieved by the methods and apparatuses described in the independent claims.

Advantageous embodiments of the invention are described in the dependent claims.

In this connection, protection is claimed for:
- a method for additive manufacturing in which such material transportation takes place;
- a manufacturing system for additive manufacturing in which such material transportation takes place;
- a method for transporting powdered build material in a manufacturing system for additive manufacturing or in a system for processing powdered build material; and
- a transportation device for transporting powdered build material in a manufacturing system for additive manufacturing.

The advantages and embodiments explained below in conjunction with the method also apply, mutatis mutandis, to the apparatuses according to the present invention, and vice versa.

A central idea of the invention is to cause the build material to form, during transportation from the one space into the other space, a powder column that influences a gas exchange between the two spaces. The height of the powder column can then be deliberately modified in order to influence that gas exchange. If gas separation of the spaces is desired, that is ensured by a correspondingly configured powder column, by the fact that the transportation path of the build material, and thus the gas path from the one space into the other space, is closed off in gas-tight fashion by the build material itself. Instead of gas separation of the spaces, however, a defined gas transition or gas transportation between the two spaces can also occur by corresponding configuration of the powder column. In particular, the gas volume leaving the space through the transportation paths of the build material, or the gas volume entering the space along that path, can be deliberately influenced, in particular regulated or controlled. What will be described first of all below is the variant in which a gas separation is desired. The explanations in that connection also apply correspondingly to the variant of a deliberate gas transition.

According to the present invention no additional parts, in particular no movable mechanical parts such as airlocks or the like, are used for gas separation of the spaces. Instead, the powdered build material itself, in the form of a powder column, serves as a gas-tight closure of the transportation path of the build material. In other words, the transportation path of the powder is closed off in gas-tight fashion by the powder itself. The powder column serves as a gas lock, i.e. it prevents a gas exchange between the two spaces between which material transportation occurs.

Furthermore, no additional blocking material of any kind, for example a material not required for additive manufacturing, is used in order to produce gas separation with the aid of the powder column. The build material that is in any case required in the space, or is to be transported into the space, is used instead. That material is used simultaneously as a closure material for the transportation path and thus to close off the transition between the two spaces.

A transportation device that makes possible the formation of a powder column is provided for this purpose. Formation of the powder column preferably occurs exclusively due to gravity conveyance of the powder, i.e. by the fact that the powder falls downward in response to gravity. The powder is then subjected only to the pressure of its own weight, and becomes correspondingly compressed in the powder column so that it performs the desired gas blocking function. The powder column slides down, only in response to gravity, toward an exit opening or outlet opening, and then enters the destination space. The exit opening or outlet opening is equipped with a closure mechanism that, in the closed state, prevents build material from emerging from the powder column. A controllable closure element that is movable, preferably in motorized fashion, out of a closed position into an open position and back again is preferably provided for this purpose.

The transportation path between the spaces which is furnished by the transportation device is closed off by the powder column. The transportation device or the transportation path can be embodied as a separate connection between the two spaces. Among other means, pipes, funnels, and the like, having a constant or changing cross section, are suitable for constituting the powder column. The transportation device or the transportation path can, however, also be embodied as part of one of the two spaces. In both cases a defined space for formation of the powder column is furnished, either by the boundaries of the space itself or by an additional suitable design means; especially in the case of an implementation using separate elements, the transportation device can comprise not only an exit opening or outlet opening but also a defined delivery opening.

The transportation device can furthermore comprise or be connected to conveying means. Conveying means of this kind serve for delivery or removal of the powdered build material, for example for pneumatic powder conveyance by means of a carrier gas.

Material transportation serves for the introduction and/or discharge, or delivery and/or removal, or filling and/or emptying, or admission and/or release, of powdered build material. Expressed differently, the material transportation taking place in this manner can occur, for example, out of a supply container or conveying conduit into a process chamber or a destination space, or out of such a process chamber or destination space into a supply container or conveying conduit. In other words, the material transportation proposed by the invention can be used both for a powder input apparatus and for a powder discharge apparatus, in general terms for supplying powder.

The powdered build material can be any suitable material, in particular a metal powder or plastic powder. The build material is preferably a fine powder having a particle size of less than 0.5 mm. The finer the powder that is used, the more effective the seal of the powder column formed by the material.

In order ensure gas separation, a minimum quantity of build material is always held in the powder column. In other words, the delivery of build material in order to build up the powder column on the one hand, and the withdrawal of build material from the powder column on the other hand, always occur in such a way that a minimum fill level for the powder column is maintained. Both the addition of build material to the powder column and the withdrawal of build material from the powder column can be accomplished discontinuously, continuously, or quasi-continuously.

Regulation of the powder fill height in order to ensure a minimum powder-column height is effected in particular as a function of the pressure difference between the two spaces and/or or the particle size of the powder and/or further parameters. The fill height of the powder column is monitored, continuously or at suitable time intervals, with the aid of suitable fill level sensors. If the fill height falls below a defined limit value, the powder column is filled up again until the desired fill value is reached. The powder fill height is regulated preferably by closed-loop control of the conveying speed of the powder.

The fill height of the powder column can be monitored directly, for example with the aid of fill level sensors, or indirectly, for example by ascertaining the current pressure difference in the spaces connected to one another via the powder column.

A release of build material from the powder column, i.e. for example a delivery of build material into the process space or a withdrawal of build material from the process space, takes place in each case only to the extent that a specific fill level, namely a minimum fill height, is maintained. At the same it is useful if such a withdrawal of build material from the powder column does not take place until a specific fill level (minimum fill height plus X) exists or is reached.

In any event, a minimum fill height that produces gas sealing between the spaces, and prevents or minimizes the passage of gases through the powder column and thus a gas exchange between the spaces, always remains in order to ensure gas separation. By regulating or modifying the fill height of the powder column, however—controllable most easily by modifying the defined limit value of the fill height of the powder column—it is just as easy to decrease or even completely eliminate gas separation. This can advantageously be utilized to bring about, in a particularly simple manner, a defined unpressurized delivery of additives, or an introduction of reaction gases, etc., into the atmosphere of the destination space. In other words, gas exchange between the spaces can be not only prevented but also adjusted in controlled fashion. This deliberate adjustment of gas exchange is implemented, for example, by the fact that the height of the powder column is increased or decreased by respectively adding or releasing build material as soon as the fill height respectively falls below a lower limit value or exceeds an upper limit value; instead of the fill height limit values, it is also possible to utilize for control purposes other limit values that, in particular, correspond to the fill height, for example limit pressure values.

If several process chambers that are connected to a common delivery conduit or to a common discharge conduit for the build material are present in a layer building system or in a system for processing build material, it is not only possible for different atmospheres to be present within the various process chambers within the same system. With a suitable embodiment of the delivery conduit or discharge conduit and strict gas separation of the spaces, it is also possible for different atmospheres to exist in different portions of the respective conduits.

The invention is applicable particularly advantageously in conjunction with the supplying of powder to a layer building system, the build material being transported, using the invention, into and/or out of the process chamber in which the actual build process takes place. In a context of application of the invention to auxiliary processes, the process chamber that serves as a destination chamber or initial chamber can be the purification chamber, mixing chamber, or the like. The invention is also usable, however, for transporting build material in conjunction with other manufacturing systems that do not operate in accordance with the layer building principle.

The build material transportation path that is used by the invention is preferably the only possible transportation path of the build material into the destination space. In other words, the system is preferably embodied in such a way that the manner according to the present invention in which build material is transported is the only possibility for delivering build material to the process chamber or for withdrawing build material from the process chamber. The system can therefore be of particularly simple construction.

Preferably, the transportation path is also the only path that is present for a transportation or exchange of gas between the spaces. The powder column that, according to the present invention, closes off the transportation path thus represents the only possibility for closing off the connection between the two spaces in gas- or pressure-tight fashion. This is preferably the case even when a closure mechanism is present for closing off the exit opening or outlet opening. In other words, that closure mechanism does not need to be embodied in gas- or pressure-tight fashion.

In contrast to systems known from the existing art, in which each powder column constituted between two spaces influences gas exchange between those spaces in accordance with its nature—i.e., depending on its height, either prevents it or permits it to a greater or lesser degree—the present invention relates not only to undesired, arbitrary influencing of gas exchange but also to intentional, deliberate control of the height of the powder column of the build material for the purpose of deliberately influencing gas exchange between spaces having different atmospheres.

An exemplifying embodiment of the invention will be explained in further detail with reference to the drawings.

BRIEF DESCRIPTION OF THE DRAWING

The single FIGURE of the drawing depicts a portion of a layer building system.

DESCRIPTION OF THE INVENTION

The FIGURE shows the invention not accurately to scale, merely schematically, and only with its essential constituents.

A layer building system 1, which operates, for example, in accordance with the laser sintering method, encompasses a process chamber 2, filled with a special process atmosphere, in which a build platform 3, which is arranged in an X-Y plane and on which a three-dimensional object 4 is generated in layers in known fashion, is provided. The build material is a suitable plastic powder. After production of a layer n, in order to produce a new layer n+1 the build platform, along with the layers that have already been created and cured, is shifted downward over a specific path length. That purpose is served by a drive device (not depicted), for example an electric motor, for generating a motion of build platform 3 in a Z direction, i.e. perpendicularly to the build plane.

Layer building system 1 encompasses at least one solidification radiation source 5 that furnishes radiation energy for local heating of build material in order to selectively solidify the latter. The radiation source is, for example, a laser that emits in guided fashion a laser beam 6 that extends into process chamber 3.

Layer building system 1 furthermore encompasses an application device 7 with which, during the running time of the system, build material is applied and distributed from time to time as a thin layer onto build platform 3 or onto a build layer that is already present. Application device 7 is, for example, a device for applying a powder charge, which extends into process chamber 2 or is connected to process chamber 2 via a transportation path for build material. The powdered build material is delivered to application device 7 via an attached furnishing device. The furnishing device is, for example, a delivery conduit 8, furnishing being effected by pneumatic powder conveying by means of a carrier gas.

Provision can be made to remove excess build material from build platform 3 between the solidification of a layer n and the application of new build material for a subsequent layer n+1. A device (not illustrated) suitable for that purpose is provided in this case, for example in the form of a wiper blade or the like. In any event, after completion of the building of object 4, process chamber 2 contains excess or unneeded loose build material that can be withdrawn again from process chamber 2. A withdrawal device 9 that is connected to process chamber 2 via a transportation path for build material, or that extends into process chamber 2, is provided for that purpose. A discharge device, for example in the form of a discharge conduit 10, with which the build material can be transported away (once again by pneumatic powder conveyance), is connected to withdrawal device 9.

Furnishing device 8 and application device 7 on the one hand, and discharge device 10 and withdrawal device 9 on the other hand, are respectively connected to a corresponding control system (not illustrated) that controls the delivery of material into process chamber 2 and the removal or withdrawal of material from process chamber 2, as well as discharge. These control systems are implemented preferably in the form of computer programs that carry out the steps relevant for the control system, in particular regulating the conveying performance of the powder delivery and discharge systems, when the computer program is executed on a computer having a processor. This preferably refers to the central control computer or process computer (not illustrated) of layer building system 1.

Upon delivery of build material in the context of supplying powder to layer building system 1, the powdered build material is transported from time to time, only in response to gravity, i.e. in a Z direction, from a first space (delivery conduit 8) into a second space (process chamber 2) physically separated from the first space, the atmospheres in these spaces being different from one another, for example, in terms of their gas composition. During this transportation of the build material, a powder column 11 is formed which prevents a gas exchange between the two spaces 8, 2. Application device 7 serves as a transportation device for the build material and is embodied in such a way that the build material forms a powder column 11 as soon as application device 7 is populated with build material via furnishing device 8. Application device 7 encompasses for this purpose a cylindrical tube portion 12 in which powder column 11 builds up in defined fashion.

Upon withdrawal of build material in the context of powder disposal from layer building system 1, the powdered build material is transported from time to time only in response to gravity, i.e. in a Z direction, from a first space (process chamber 2) into a second space (discharge conduit 10) physically separated from the first space, the atmospheres in these spaces also being different from one another. During this transportation of the build material, a powder column 11 is formed which prevents a gas exchange between the two spaces 2, 10. Withdrawal device 9 serves as a transportation device for the build material, and is embodied in such a way that the build material forms a powder column 11 as soon as withdrawal device 9 is populated with build material via process chamber 2. Withdrawal device 9 encompasses for this purpose a cylindrical tube portion 12 in which powder column 11 builds up in defined fashion.

The withdrawn build material can then be purified or otherwise processed in a processing system (not illustrated) and delivered again in recirculated fashion via furnishing device 8 to the manufacturing process. The processing system can also comprise transportation devices 7, 9 operating in accordance with the invention.

In both cases, tube portion 12 defines the transportation path between the two spaces, that path being capable, with the aid of powder column 11, of being shut off for a transportation or exchange of gas but at the same time permitting the transportation of build material from one space to another. In both cases, tube portion 12 ends at an exit opening or outlet opening 13 through which the build material is transported further. This opening 13 can be closed off in each case by a non-pressure-tight closure element 14. Tube portion 12 does not need to be cylindrical; a different configuration is also possible, for example a funnel shape (frustoconical).

In both cases, i.e. in the context of both supplying and disposing of powder, the height of powder column 11 is monitored with the aid of a number of suitable fill level sensors (not illustrated) and can be modified by means of the control systems, the fill level being adjusted so that no gas exchange occurs between the spaces. This is achieved by the fact that the delivery of powder material to powder column 11 and the discharge of powder material from powder column 11 are constantly controlled so that a minimum fill height of powder column 11 is always guaranteed. For this purpose, the control systems regulate pneumatic powder conveyance in delivery conduit 8 and discharge conduit 10, and the motorized driving of closure elements 14. The respective minimum fill height for reliable gas separation depends, inter alia, on the pressure difference between the two spaces. Suitable pressure sensors (not illustrated) that are connected to the control systems can be provided for this purpose. The control systems then ascertain the required minimum fill height in consideration of the material that is required for the building process and is to be delivered to process chamber 2, of the pressure difference between the spaces, and of further parameters such as the particle size of the build material being used, and ensure during the operation of layer building system 1, by way of corresponding control instructions for filling powder column 11 with build material and/or control instructions for withdrawing build material from powder column 11, that that fill height is constantly maintained. If necessary, the height of powder column 11 can also be modified in defined fashion, in particular decreased, in order to make possible a deliberate gas exchange between the two spaces.

All features presented in the description, in the claims that follow, and in the drawings can be essential to the invention both individually and in any combination with one another.

LIST OF REFERENCE CHARACTERS

1 Layer building system
2 Process chamber
3 Build platform
4 Object
5 Radiation source
6 Laser beam
7 Application device
8 Furnishing device, delivery conduit
9 Withdrawal device
10 Discharge device
11 Powder column
12 Tube portion
13 Opening
14 Closure element

The invention claimed is:

1. A method for additive manufacturing, which comprises the steps of:
   transporting a powdered build material from a first space into a second space of a manufacturing system for the additive manufacturing, atmospheres in the first and second spaces being different from one another, and the powdered build material forming a powder column that influences a gas exchange between the first and second spaces, a height of the powder column being deliberately modifiable in order to influence the gas exchange;
   performing one of:
      adjusting the height of the powder column to suppress a gas exchange between the first and second spaces; or
      modifying the height of the powder column to enable a deliberate gas exchange between the first and second spaces.

2. The method according to claim 1, which further comprises monitoring the height of the powder column.

3. The method according to claim 1, which further comprises:
   transporting the powdered build material to the manufacturing system; and
   transporting the powdered build material into a process chamber of the manufacturing system.

4. The method according to claim 3, which further comprises removing the powdered build material from the manufacturing system by the powdered build material being transported out of the process chamber of the manufacturing system.

5. The method according to claim 1, which further comprises performing a transportation of the powdered build material during a running time of the manufacturing system.

6. A method for transporting powdered build material from a first space into a second space of a manufacturing system for additive manufacturing or of a system for processing the powdered build material, atmospheres in the first and second spaces being different from one another, the powdered build material forming a powder column that influences a gas exchange between the first and second spaces, a height of the powder column being deliberately modifiable in order to influence that gas exchange, which comprises the steps of:
  adjusting the height of the powder column to suppress the gas exchange between the first and second spaces; or
  modifying the height of the powder column to enable a deliberate gas exchange between the first and second spaces.

* * * * *